United States Patent [19]
Taubitz et al.

[11] Patent Number: 4,780,509
[45] Date of Patent: Oct. 25, 1988

[54] PREPARATION OF IMPACT-RESISTANT THERMOPLASTIC MOLDING

[75] Inventors: Christof Taubitz, Wachenheim; Erhard Seiler, Ludwigshafen; Lothar Schlemmer, Maxdorf, all of Fed. Rep. of Germany

[73] Assignee: BASF Aktiegesellschaft, Fed. Rep. of Germany

[21] Appl. No.: 43,492

[22] Filed: Apr. 28, 1987

[30] Foreign Application Priority Data

May 10, 1986 [DE] Fed. Rep. of Germany ....... 3615853

[51] Int. Cl.$^4$ ............................................ C08F 257/02
[52] U.S. Cl. ...................... 525/282; 525/53; 525/285; 525/301; 525/296
[58] Field of Search ......................... 525/282, 285, 301

[56] References Cited

U.S. PATENT DOCUMENTS 3,661,866 5/1972 Schwarz .............................. 525/285
4,292,414 9/1981 Saito et al. ........................... 525/285

FOREIGN PATENT DOCUMENTS 0031914 2/1982 Japan .................................... 525/285

Primary Examiner—Wilbert J. Briggs, Sr.
Attorney, Agent, or Firm—Keil & Weinkauf

[57] ABSTRACT

Impact-resistant thermoplastic molding materials based on a resin A containing one or more vinylaromatic monomers are prepared by reacting the resin A (component A) with one or more monomers from the group consisting of the $\alpha,\beta$-unsaturated dicarbonyl compounds (component B) by a process in which the reaction is carried out in a melt of A in the presence of B and in the absence of initiators, and the resin A used is one which contains from 3 to 50% by weight, based on A, of one or more elastomers $a_1$ (rubber) and has been prepared in a conventional manner by polymerizing one or more vinylaromatic monomers of 8 to 12 carbon atoms in the presence of the elastomer $a_1$ are used for the production of moldings.

5 Claims, No Drawings

PREPARATION OF IMPACT-RESISTANT THERMOPLASTIC MOLDING

The present invention relates to a process for the preparation of impact-resistant thermoplastic molding materials based on a resin A containing one or more vinylaromatic monomers by reacting the resin A (component A) with one or more monomers from the group consisting of the $\alpha, \beta$-unsaturated dicarbonyl compounds (component B) at elevated temperatures.

The relevant prior art includes: U.S. Pat. No. 3,661,866.

It is known that the impact strength of polystyrene can be improved by incorporating a rubber-like material in the polystyrene. To do this, either the two components are mechanically mixed with one another or, advantageously, the polymerization of the styrene is carried out in the presence of the rubber, leading to high-impact polystyrenes (HIPS).

The poor adhesion and the poor compatibility with other polymers are disadvantages.

U.S. Pat. No. 3,661,866 describes modified polystyrenes where polystyrene is reacted with maleic anhydride using from 0.1 to 5 moles of a free radical former per mole of styrene, based on the styrene monomer unit. The sharp decrease in the molecular weight of the polystyrene is a disadvantage.

It is an object of the present invention to prepare polymers which contain vinylaromatics and have high impact strength and at the same time good compatibility with other polymers.

We have found that this object is achieved by a process as set forth below.

The present invention therefore relates to a process for the preparation of impact-resistant thermoplastic molding materials based on a resin A containing one or more vinylaromatic monomers by reacting the resin A (component A) with one or more monomers from the group consisting of the $\alpha, \beta$-unsaturated dicarbonyl compounds (component B) at elevated temperatures.

In the process, the reaction is carried out in a melt of A in the presence of B and in the absence of initiators, and the resin A used is one which contains from 3 to 50% by weight, based on A, of one or more elastomers $a_1$ (rubber) and has been prepared in a conventional manner by polymerization of one or more vinylaromatic monomers of 8 to 12 carbon atoms in the presence of the elastomer $a_1$.

The composition of the molding material in terms of the components, the preparation of the latter and the preparation of the molding material are described below.

The molding material contains (preferably consists of) the following amounts of the components, based in each case on A+B:

A from 80 to 99.95, preferably from 90 to 99.8, in particular from 97 to 99.9, % by weight, the component A (resin A) containing from 3 to 50, preferably from 3 to 30, in particular from 5 to 20, % by weight, based on A, of an elastomer $a_1$, and B from 20 to 0.05, preferably from 10 to 0.1, in particular from 3 to 0.1, % by weight.

The molding material may additionally contain from 0.1 to 90, preferably from 0.5 to 40, parts by weight of a component C per 100 parts by weight of A+B.

Component A

Component A (resin A) is composed of one or more vinylaromatic monomers of 8 to 12 carbon atoms and of an elastomer $a_1$.

The vinylaromatic monomer is preferably selected from the group consisting of styrene, $\alpha$-methylstyrene and/or p-methylstyrene. Comonomers, such as (meth)acrylates or (meth)acrylic acid, may also be used in minor amounts but are generally absent. Particularly preferably, styrene is used alone.

The elastomer $a_1$ (rubber-like polymer) is in general polyisoprene rubber, acrylonitrile/butadiene rubber, ethylene/propylene rubber or polyacrylate rubber. Polybutadiene/styrene/butadiene and styrene/butadiene block rubbers are preferred, and the block rubber may be in a form familiar to the skilled worker, such as sharply defined or poorly defined blocks, AB, ABA, ABAB, ABC, star-shaped etc. (also see Winnacker-Küchler, Chemische Technologie, vol. 6, page 373). Among the block rubbers, in particular the linear two-block copolymers containing from 15 to 75% by weight of block styrene and from 85 to 25% by weight of butadiene are used. These have mean molecular weights (weight average) of from 10,000 to 2 million, preferably from 50,000 to 200,000.

Medium or high-cis polybutadiene having a weight average molecular weight of from 50,000 to 450,000 is preferably used instead of the stated two-block copolymers or as a mixture with these.

The impact-resistant resin A is prepared in a conventional manner by polymerization of the vinylaromatic monomers in the presence of the elastomer $a_1$.

In the preferred procedure, the elastomer $a_1$ (the rubber) is generally dissolved in the monomeric vinylaromatic monomer (styrene), and this starting solution is then polymerized by a continuous or batchwise mass polymerization, solution polymerization or combined mass/suspension polymerization method. The solution to be polymerized, consisting of the elastomer in the styrene monomer, separates into two phases after the polymerization reaction begins, one of which, a solution of the elastomer in the monomeric styrene, initially forms the coherent phase, while the second phase, a solution of the resulting polystyrene in its own monomer, remains suspended in it in the form of droplets. As the conversion increases, the amount of the second phase increases at the expense of the first phase and the monomers disappear; a change in the phase coherence occurs as soon as the amount of polystyrene formed exceeds the amount of rubber used. In this phase inversion, drops of rubber solution form in the polystyrene solution; however, these drops in turn contain firmly enclosed smaller droplets of the polystyrene, which is now the outer phase. During this polymerization, grafting of the rubber by polystyrene chains takes place at the same time.

The polymerization takes place as a rule in a plurality of stages, the solution of the rubber in the styrene being polymerized in the first polymerization stage, during the prepolymerization, under shearing until a conversion beyond the phase inversion point is reached, and polymerization then being completed with reduced shearing or in the absence of shearing until the desired styrene conversion is obtained. The continuous mass or solution polymerization is described in, for example, U.S. Pat. Nos. 2,694,692 and 3,243,481 and German Laid-Open Application DOS No. 1,770,392. The batchwise procedure for the combined mass/suspension polymerization is disclosed in, for example, German Laid-Open Application DOS No. 1,595,230.

Component B

Component B comprises monomers selected from unsubstituted or substituted $\alpha, \beta$-unsaturated dicarbonyl compounds, such as $\alpha, \beta$-unsaturated dicarboxylic acids, dicarboxylic anhydrides, dicarboximides, which may be N-substituted, monoesters of the dicarboxylic acids, monoamides of the dicarboxylic acids, diesters of the dicarboxylic acids and diamides of the dicarboxylic acids.

Maleic acid, maleicanhydride, methylmaleic anhydride, chloromaleic anhydride, the half esters and half amides, such as the half esters of maleic anhydride with 2-ethylhexyl alcohols, and N-phenyl-maleimide are preferred, and fumaric acid is particularly preferred.

Component C

Suitable components C are conventional assistants in the amounts familiar to the skilled worker, these being either assistants which are usually employed for the preparation of component A, e.g. mineral oils or silicone oils, or other lubricants and mold release agents.

Furthermore, the molding materials prepared by the novel process can be modified in a conventional manner. They may therefore contain, for example, polymers, reinforcing agents and fillers, in particular glass fibers, flameproofing agents, stabilizers, lubricants and dyes and pigments. Examples of suitable reinforcing agents are glass fibers, glass spheres, kaolin, quartz, mica, wollastonite, talc, asbestos, titanium dioxide, alumina, micovite, chalk or calcined aluminum silicate.

Preparation of the thermoplastic molding material

To carry out the process according to the invention, the components A and B, i.e. the resin A and the monomers B, are reacted in the melt of A in the presence of B and in the absence of initiators.

In general, the temperature is from 120° to 280° C., in particular from 140° to 240° C. Conventional mixing apparatuses, such as Brabender mixers or single-screw or twin-screw extruders, are suitable for the reaction. A twin-screw extruder having screws rotating in the same direction is preferably used for this purpose, in a viscosity range of about 0.01-300 Pas during the reaction in the extruder, the melt (the reaction mixture) being processed in a screw zone possessing kneading elements which provide thorough mixing, at kneading frequencies of up to 15 Hertz and with a velocity gradient of more than 2000 sec$^{-1}$ in the radial play between the outer edge of the screw and the barrel wall.

These measures result in thorough radial mixing of the resin A with the monomers B so that the reaction takes place homogeneously and the material is prevented from adhering to the screws and barrel walls. The reaction is preferably carried out in extruders having a conventional radial play of 0.1-0.6 mm, depending on the screw size, and a screw speed higher than 150 rpm. For example, the speed successfully used in a twin-screw extruder having screws with an outer diameter of 53 mm and a radial play of 0.2 mm is 300 rpm. This gives a maximum velocity gradient in the sheared product of 4170 sec$^{-1}$ between the outer diameter of the screw and the barrel, i.e. based on radial play. Examples of suitable kneading elements are the prismatic disks of different geometries as described in German Pat. Nos. 813,154 and 940,109, these disks being shown in cross-section in FIGS. 2–6, and, apart from the small play necessary for mechanical reasons, scraping one another in every position and, in conjunction with the barrel fins (18, 19), exerting high shearing and frictional forces on the material to be mixed. A kneading zone (7, 8, 9 in FIG. 1) consists of a plurality of such kneading disks in a staggered arrangement in the peripheral direction along the shaft (7, 8, 9 in FIG. 1).

The residence time in both the kneading zone and the reaction zone is in general from 0.5 to 20, preferably from 1 to 7, minutes.

Components A and B (with or without component C, e.g. a lubricant) are preferably metered in together and melted in a melting zone. The extruder screw in the melting zone preferably contains kneading elements. The melting zone is connected to the reaction zone, which preferably contains kneading elements and additional such elements with a backward-conveying thread. Upstream of the product discharge there is preferably a devolatilization zone for removing the volatile components. The extruded melt is generally granulated.

The granules have a variety of uses. For example, the molding materials prepared by the novel process can be used as adhesion promoters. They are also suitable as engineering materials, films, thin adhesive layers, hot melt adhesives and coatings.

The parameters described in the Examples and Comparative Experiments were determined as follows:
1. Yield stress, YS, in N/mm$^2$ according to DIN 53,455
2. Tensile strength, TS, in N/mm$^2$ according to DIN 53,455
3. Hole impact strength $a_{KL}$, in kJ/m$^2$ according to DIN 53,753.

The following products were used in carrying out the novel process and Comparative Experiments:

I. Preparation of high impact polystyrene 1

A solution consisting of 1600 g of styrene, 150 g of a butadiene/styrene block polymer with an ill-defined transition between the blocks ($\eta = 1.58$ dl/g in toluene at 25° C., block PS=39.4% by weight with $\eta = 0.470$ dl/g, total styrene content=40.5% by weight, $M_v = 98,000$, Mn=53,000), 45 g of a mineral oil, 1.8 g of tert-dodecylmercaptan, 2.2 g of octadecyl 2-(3′,5′-di-tert-butyl-4′-hydroxyphenyl)-propionate and 1.8 g of dicumyl peroxide was prepolymerized in a 5L stirred kettle possessing a paddle stirrer, at an internal temperature of 115° C. and a stirrer speed of 200 rpm, to a solids content of 46.5%. Thereafter, 1,800 ml of water which contained 9.0 g of polyvinylpyrrolidone having a K value of 90 and 1.8 g of Na$_4$P$_2$O$_7$ were added and the stirrer speed was increased to 300 rpm. Polymerization was completed in the course of a further 5 hours at 120° C. and 5 hours at 140° C., and the polymer was isolated and dried.

II. Preparation of high impact polystyrene 2

6 parts of a medium-cis polybutadiene (Diene HX 529) having a mean molecular weight of 300,000 (weight average) were dissolved in a mixture of 6 parts of ethylbenzene and 88 parts of styrene. 0.1 part of tert-dodecylmercaptan and 0.18 part of tert-butyl benzoate were then added to the mixture and polymerization was carried out at 118° C. for 2 hours and then at 140° C. The polymer was worked up using an extruder.

The Examples and Comparative Experiments which follow illustrate the novel process. In these Examples and Comparative Experiments, parts and percentages are by weight.

EXAMPLE 1

99.2% by weight of polystyrene 1 and 0.8% by weight of fumaric acid are metered into a ZSK 53 twin-screw extruder from Werner and Pfleiderer and are melted in a first zone using kneading elements at 180° C., reacted at 105° C. in a second zone with kneading and with the use of backward-conveying kneading elements and then devolatilized in a devolatilization zone at 180° C. by reducing the pressure. The mean residence time in the extruder is 4 minutes and the speed is 150 rpm. The melt which emerges is passed through a water bath and granulated. The amount of fumaric acid incorporated is 0.65% by weight.

COMPARATIVE EXPERIMENT A 98.75% by weight of polystyrene 1, 1% by weight of maleic anhydride and 0.25% by weight of dibenzoyl peroxide are reacted as described in Example 1. 0.4% by weight of maleic anhydride is incorporated.

EXAMPLE 2

99% by weight of polystyrene 2 and 1% by weight of fumaric acid are reacted as described in Example 1. The amount incorporated is 0.7% by weight.

COMPARATIVE EXPERIMENT B 98.25% by weight of polystyrene 2, 1% by weight of maleic anhydride and 0.25% by weight of dibenzoyl peroxide are reacted as described in Example 1. The amount of maleic anhydride incorporated is 0.5% by weight.

EXAMPLE 3

97% by weight of polystyrene 2 and 3% by weight of N-phenylmaleimide are reacted as described in Example 1. The amount incorporated is 1.6% by weight.

COMPARATIVE EXPERIMENT C 96.5% by weight of polystyrene 2, 3% by weight of maleic anhydride and 0.5% by weight of dibenzoyl peroxide are reacted as described in Example 1. The amount incorporated is 1.0% by weight.

The yield stress, the tensile strength and the hole impact strength were determined on samples of polymers as prepared in the Examples and Comparative Experiments A, B and C. The measured values are shown in the Table, together with those for the resins Polystyrene 1 and 2. Comparison of the mechanical properties shows that the products pepared by the novel process possess better mechanical properties than the samples from the comparative Experiments.

TABLE

| Product | Yield stress YS | Tensile strength TS | Hole impact strength $a_{KL}$ |
|---|---|---|---|
| Polystyrene 1 | 24.5 | 17.0 | 7.1 |
| Polystyrene 2 | 26.0 | 23.1 | 10.0 |
| Example 1 | 25.6 | 23.0 | 8.9 |
| Comparison A | 20.0 | 14.0 | 5.9 |
| Example 2 | 28.0 | 24.1 | 11.0 |
| Comparison B | 21.0 | 16.0 | 8.2 |
| Example 3 | 30.0 | 24.4 | 10.5 |
| Comparison C | 20.0 | 15.0 | 7.1 |

We claim:

1. A process for the preparation of an impact-resistant thermoplastic molding material based on a resin A containing one or more vinylaromatic monomers by reacting the resin A (component A) with one or more monomers selected from the group consisting of the $\alpha, \beta$-unsaturated dicarbonyl compounds (component B) at from 140° to 240° C. in a melt of A in the presence of B and in the absence of initiators, wherein the reaction is carried out in a conventional screw extruder for a residence time of from 1 to 7 minutes at a velocity gradient in the radial play between the outer edge of the screw and the barrel wall of more than 2000 sec$^{-1}$; the resin A used is one which contains from 3 to 50% by weight, based on A, of one or more elastomers $a_1$ (rubber) and has been prepared in conventional manner by polymerization of one or more vinylaromatic monomers of 8 to 12 carbon atoms in the presence of the elastomer $a_1$; and the monomers B are selected from the group consisting of fumaric acid and N-phenyl-substituted maleimide.

2. A process as claimed in claim 1, wherein the reaction is carried out in the presence of lubricants and/or mold release agents.

3. A process as claimed in claim 1, wherein the resin A used is one which contains from 3 to 30% by weight, based on A, of one or more elastomers $a_1$ (rubber) based on polybutadiene and/or on butadiene/styrene two-block copolymers and has been prepared in a conventional manner by polymerizing styrene in the presence of the elastomer $a_1$.

4. A process as claimed in claim 1, wherein the monomer B is fumaric acid.

5. A process as claimed in claim 1, wherein the monomers B are used in an amount of from 0.05 to 20% by weight, based on A+B.

* * * * *